(12) United States Patent
Shikama

(10) Patent No.: US 12,386,144 B2
(45) Date of Patent: Aug. 12, 2025

(54) LENS DRIVE

(71) Applicant: Changzhou AAC Raytech Optronics Co., Ltd., Changzhou (CN)

(72) Inventor: Kazuo Shikama, Osaka (JP)

(73) Assignee: Changzhou AAC Raytech Optronics Co., Ltd., Changzhou (CN)

( * ) Notice: Subject to any disclaimer, the term of this patent is extended or adjusted under 35 U.S.C. 154(b) by 575 days.

(21) Appl. No.: 17/726,560

(22) Filed: Apr. 22, 2022

(65) Prior Publication Data
US 2023/0314757 A1 Oct. 5, 2023

(30) Foreign Application Priority Data

Mar. 31, 2022 (JP) ................. 2022-060629

(51) Int. Cl.
| | |
|---|---|
| *G02B 7/09* | (2021.01) |
| *G02B 7/02* | (2021.01) |
| *G02B 7/10* | (2021.01) |
| *G02B 27/64* | (2006.01) |
| *G02B 7/00* | (2021.01) |

(52) U.S. Cl.
CPC ............. *G02B 7/09* (2013.01); *G02B 7/021* (2013.01); *G02B 7/102* (2013.01); *G02B 27/646* (2013.01); *G02B 7/006* (2013.01)

(58) Field of Classification Search
None
See application file for complete search history.

(56) References Cited

U.S. PATENT DOCUMENTS

| | | | |
|---|---|---|---|
| 2007/0230935 A1* | 10/2007 | Yahagi | .................. G02B 7/36 |
| | | | 348/E5.045 |
| 2016/0274375 A1* | 9/2016 | Park | .................. G02B 27/646 |
| 2018/0120674 A1* | 5/2018 | Avivi | .................. G03B 3/10 |
| 2019/0377241 A1* | 12/2019 | Lee | .................. H04N 23/45 |

FOREIGN PATENT DOCUMENTS

CN 202196247 U * 4/2012

\* cited by examiner

*Primary Examiner* — Stephone B Allen
*Assistant Examiner* — Tamara Y. Washington
(74) *Attorney, Agent, or Firm* — Wiersch Law Group

(57) ABSTRACT

Provided is a lens drive including: a housing; a focus adjustment mechanism including a lens assembly having an optical axis and a fixing member fixed to the housing, the lens assembly is movably connected to the fixing member, and the lens assembly includes at least one lens piece movable along an optical axis; an anti-shake mechanism including a bottom plate fixed on the housing and an image sensor module movable relative to the bottom plate in a direction perpendicular to the optical axis; and a shock absorbing gel provided between the fixing member and the image sensor module. The shock absorbing gel can absorb the interaction force between the anti-shake mechanism and the focus adjustment mechanism when the lens drive is impacted by the external environment, thereby reducing the possibility of damage to the components in the lens drive.

15 Claims, 13 Drawing Sheets

A-A

A-A

B-B

C-C

C-C

LENS DRIVE

TECHNICAL FIELD

The present disclosure relates to the technical field of imaging devices and, in particular, to a lens drive.

BACKGROUND

In the related art, there exist gaps between various parts inside a camera device. When subjected to an external impact, different internal structures may collide with each other, thereby causing damage to the internal parts of the camera device, and thus reducing the service life of the camera device.

Therefore, it is necessary to provide a lens drive that solves the problem that the internal parts of the camera device are easily damaged due to mutual collision.

SUMMARY

An object of the present disclosure is to provide a lens drive.

The technical solution of the present disclosure is as follows.

A lens drive, including: a housing; a focus adjustment mechanism including a lens assembly having an optical axis and a fixing member fixed to the housing, the lens assembly is movably connected to the fixing member, and the lens assembly includes at least one lens piece movable along an optical axis; an anti-shake mechanism including a bottom plate fixed on the housing and an image sensor module movable relative to the bottom plate in a direction perpendicular to the optical axis; and a shock absorbing gel provided between the fixing member and the image sensor module.

As an improvement, the shock absorbing gel is disposed at a position where a distance between the fixing member and the image sensor module is the smallest.

As an improvement, the focus adjustment mechanism is an auto-focusing mechanism, and the lens assembly includes a lens having the at least one lens piece, a lens holder for installing the lens, and an elastic piece for movably connecting the lens holder to the fixing member. The auto-focusing mechanism includes a first coil fixed on the lens holder, and the fixing member includes a base fixed to the housing and a first magnet fixed on the base and opposite to the first coil.

As an improvement, the shock absorbing gel is disposed on a surface of the base and/or the first magnet facing the image sensor module.

As an improvement, a surface of the base facing the image sensor module is provided with a protrusion, and the shock absorbing gel is disposed on the protrusion.

As an improvement, the image sensor module includes a movable frame, a filter fixed to the movable frame and close to the lens, and a sensor located on an image side of the filter, and the shock absorbing gel is provided on a surface of the movable frame facing the focus adjustment mechanism.

As an improvement, a surface of the movable frame facing the focus adjustment mechanism is provided with a protrusion, and the shock absorbing gel is provided on the protrusion.

As an improvement, one side of the shock absorbing gel abuts against a surface of the image sensor module facing the focus adjustment mechanism, and the other side of the shock absorbing gel abuts against a surface of the fixing member facing the anti-shake mechanism.

As an improvement, the focus adjustment mechanism is a zoom mechanism, and the lens assembly includes at least two lens pieces, and a distance between adjacent lens pieces of the at least two pieces is adjustable.

As an improvement, a prism for changing an optical path is provided on an object side and/or an image side of the focus adjustment mechanism.

The beneficial effect of the present disclosure is that the shock absorbing gel of the present disclosure can absorb the interaction force between the anti-shake mechanism and the focus adjustment mechanism when the shockproof device is impacted by the external environment, thereby reducing damage to the components in the lens drive when the image sensor module shakes suddenly by the effect of shock absorption and thus reduce the impact to the focus adjustment mechanism.

REFERENCE SIGN

1—housing;
201—auto-focusing mechanism;
202—zoom mechanism;
203—periscope lens;
  21—lens assembly;
    211—lens;
      211a—optical axis;
    212—lens holder;
    213—elastic member;

22—fixing member;
221—base;
222—first magnet;
23—first coil;
24—first position detection unit;
25—position detection magnet;
26—holder gel;
27—first flexible substrate;
28—claw member;
3—anti-shake mechanism;
31—bottom plate;
32—image sensor module;
321—movable frame;
322—filter;
323—sensor;
33—second coil;
34—second magnet;
35—yoke;
36—second position detection unit;
37—second flexible substrate;
38—bearing surface;
39—bearing member;
4—shock absorbing gel;
5—protrusion;
6—bottom plate gel;
7—pedestal.

The accompanying drawings are incorporated in and constitute a part of the specification, which illustrate embodiments and together with the description and serve to explain the principles of the present disclosure.

DESCRIPTION OF EMBODIMENTS

The present disclosure will be further described below with reference to the accompanying drawings and embodiments.

Figure 1:
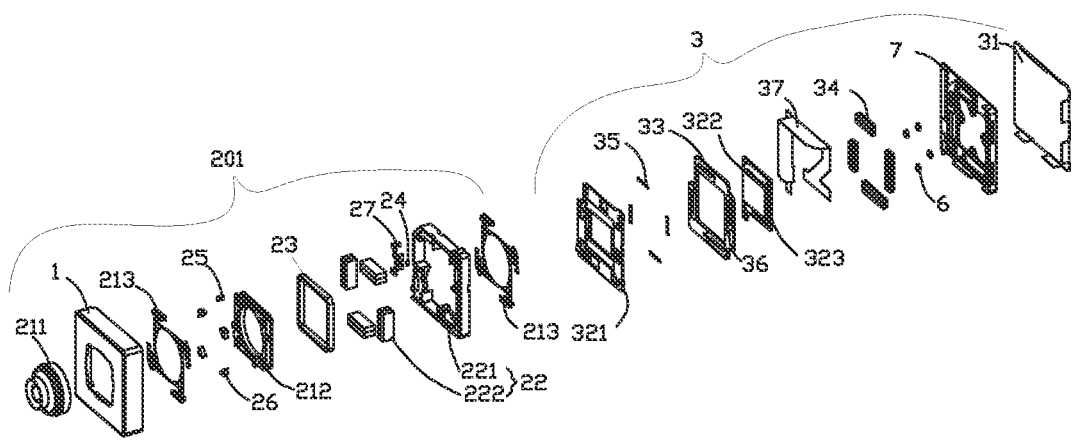
FIG. 1 is an exploded view of a lens drive according to an embodiment of the present disclosure.
Figure 2:
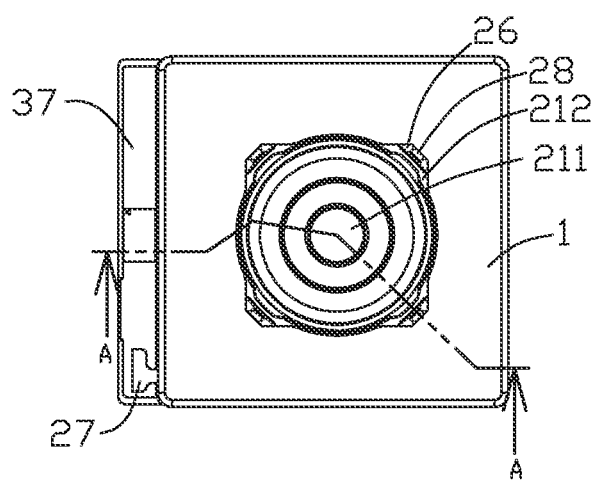
FIG. 2 is a top view of a lens drive according to an embodiment of the present disclosure.
Figure 3:
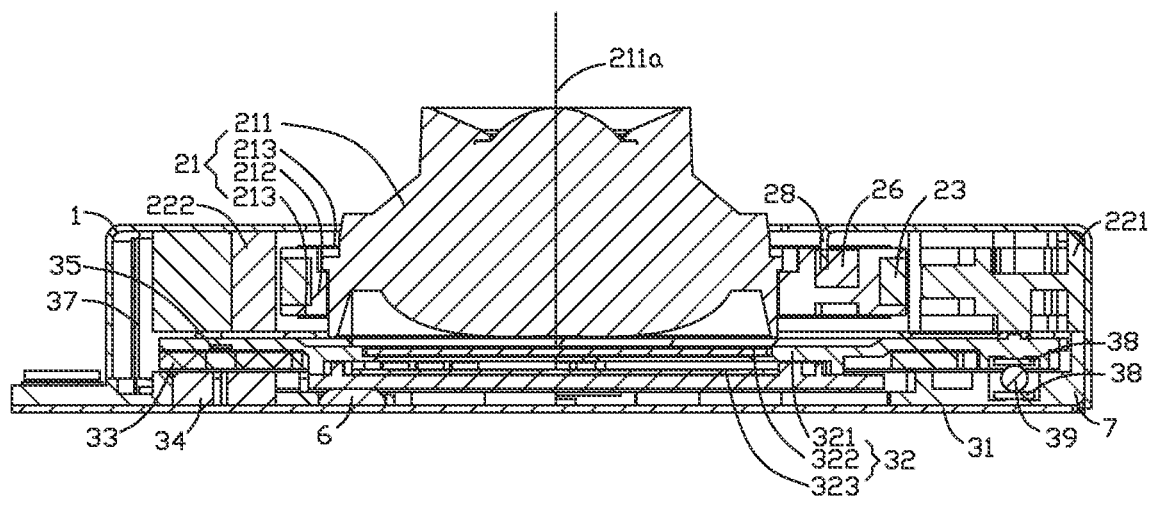
FIG. 3 is a cross-sectional view taken along section line AA of the top view of the lens drive according to an embodiment of the present disclosure.
Figure 4:
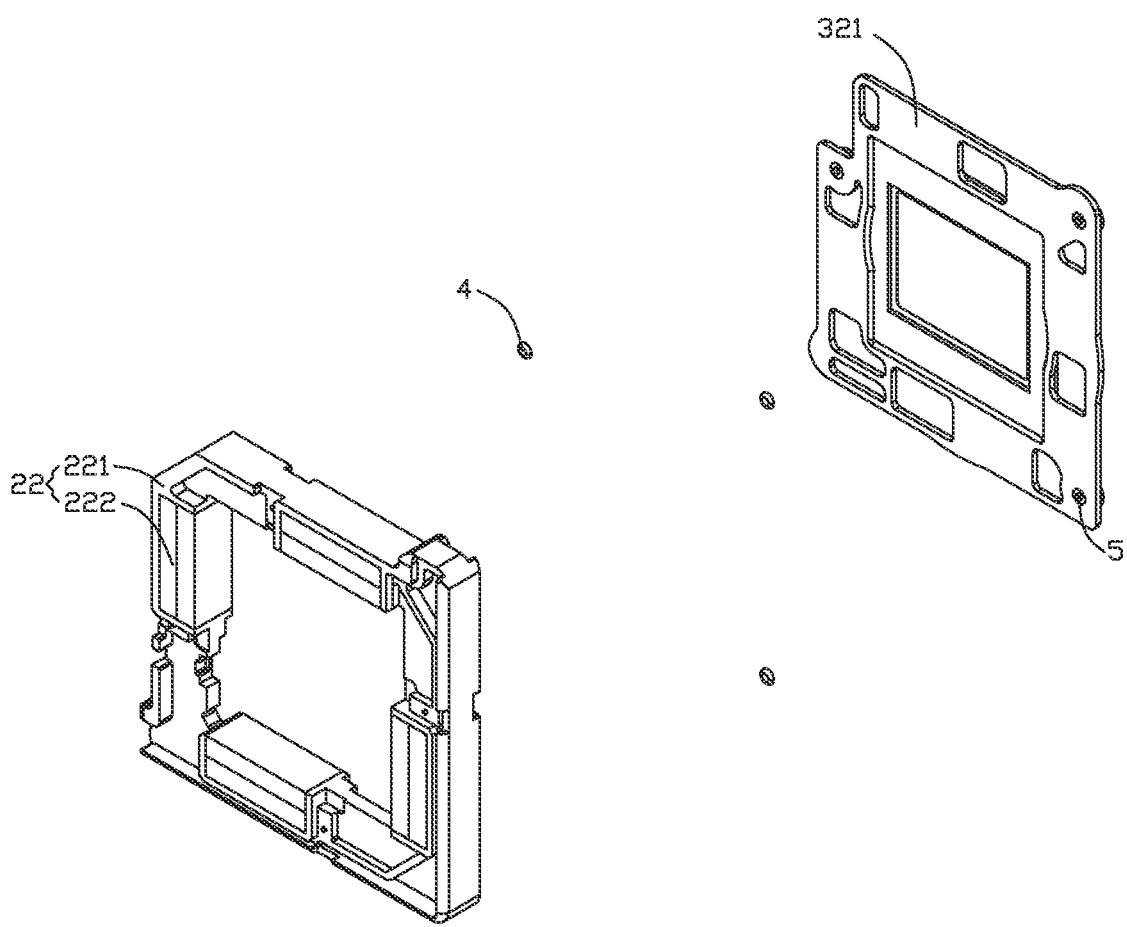
FIG. 4 is an exploded view of a fixing member, a shock-proof gel and a movable frame according to an embodiment of the present disclosure.
Figure 5:
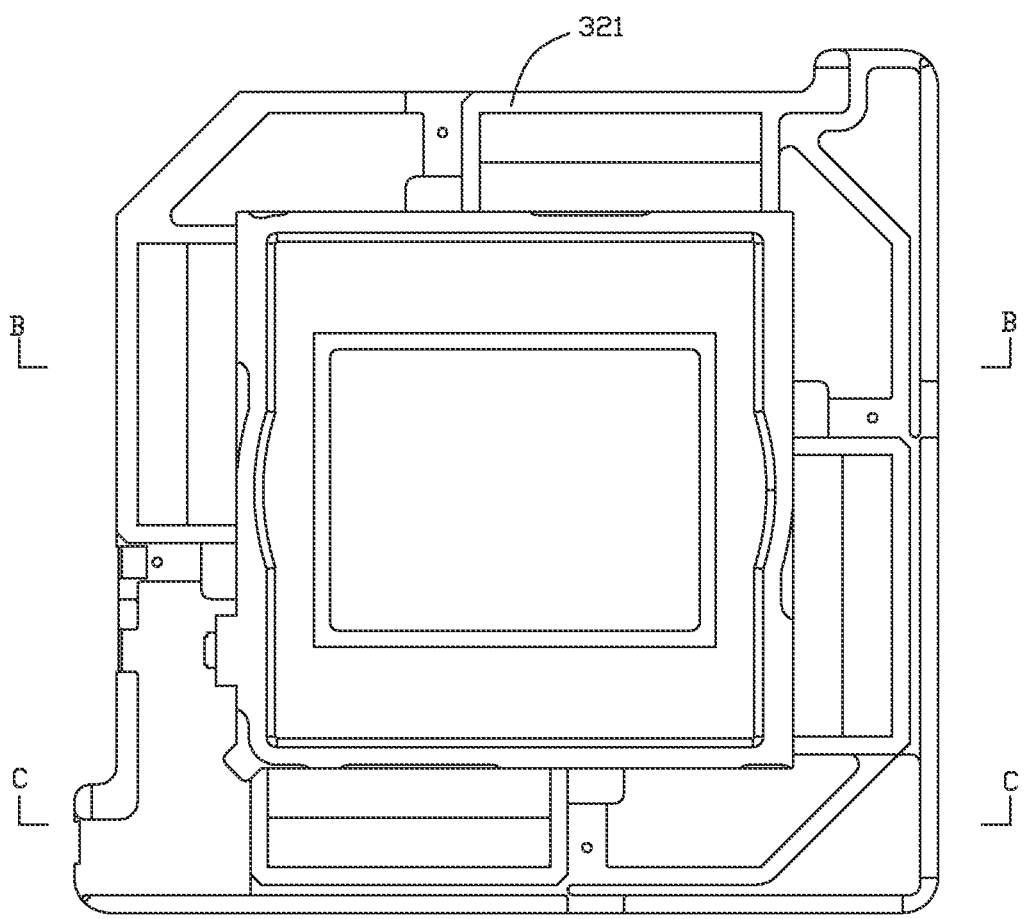
FIG. 5 is a top view of a fixing member, a shock-proof gel and a movable frame according to an embodiment of the present disclosure.
Figure 6:
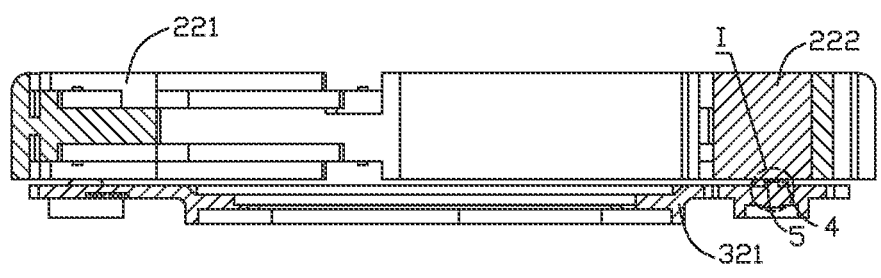
FIG. 6 is a cross-sectional view taken along section line BB of the top view of the fixing member, the shockproof gel, and the movable frame according to a first embodiment of the present disclosure.
Figure 7:
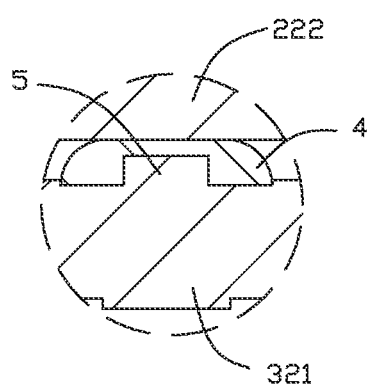
FIG. 7 is a partial enlarged view of part I in FIG. 6.
Figure 8:
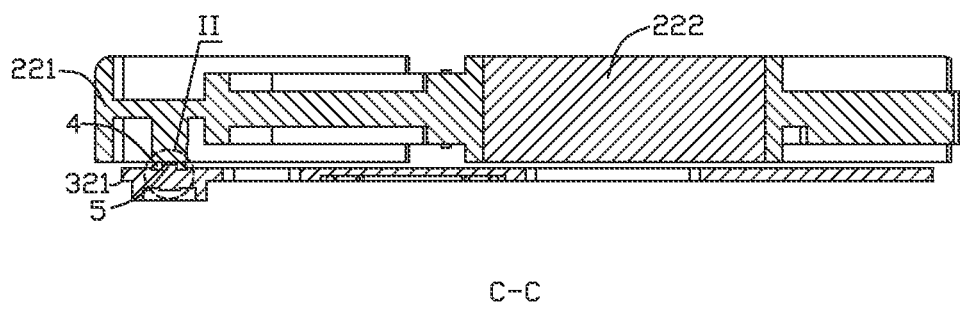
FIG. 8 is a cross-sectional view taken along section line CC of the top view of the fixing member, the shockproof gel, and the movable frame according to a first embodiment of the present disclosure.
Figure 9:
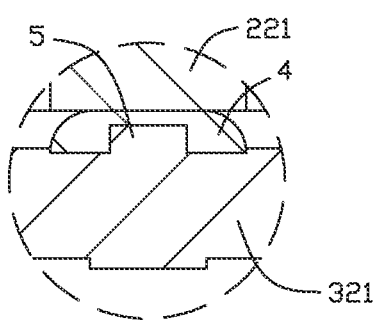
FIG. 9 is a partial enlarged view of part II in FIG. 8.

As shown in FIGS. 1 to 3, an embodiment of the present disclosure provides a lens drive, including a housing 1, a focus adjustment mechanism, an anti-shake mechanism 3 and a shock absorbing gel 4. The focus adjustment mechanism includes a lens assembly 21 having an optical axis 211a and a fixing member 22 fixed to the housing 1. The lens assembly 21 is movably connected to the fixing member 22. Along the direction of the optical axis 211a, the lens assembly 21 includes at least one lens piece. The anti-shake mechanism 3 includes a bottom plate 31 fixed to the housing 1 and an image sensor module 32 that can move relative to the bottom plate 31 in a direction perpendicular to the optical axis. The focus adjustment mechanism and the anti-shake mechanism 3 are arranged in sequence along the direction of the optical axis 211a, and the shock absorbing gel 4 is arranged between the fixing member 22 and the image sensor module 32.

When the lens drive falls or is impacted by the external environment, the shock absorbing gel 4 can absorb the interaction force between the focus adjustment mechanism and the anti-shake mechanism 3, thereby reducing the possibility of damage to the internal parts of the lens drive, and reducing the generation of dust inside the lens drive.

As shown in FIG. 1 to FIG. 3, in an embodiment, the shock absorbing gel 4 is arranged at a position where the distance between the fixing member 22 and the image sensor module 32 is the smallest.

When the lens drive is impacted by the external environment, there is relative movement between the fixing member 22 and the image sensor, the position where the distance between the fixing member 22 and the image sensor module 32 is the smallest is most likely to contact each other and collide, causing damage to the internal parts of the lens drive. Placing the shock absorbing gel 4 at this position can more effectively reduce the possibility of damage to the internal parts in the lens drive caused by the collision between the focus adjustment mechanism and the anti-shake mechanism 3.

As shown in FIG. 1 and FIG. 3, taking the focus adjustment mechanism as the auto-focusing mechanism 201 as an example, the lens assembly 21 includes a lens 211 with lens pieces, a lens holder 212 for mounting the lens 211, an elastic member 213 for movably connecting the lens holder 212 and the fixing member 22. The auto-focusing mechanism 201 further includes a first coil 23 wound around the lens holder 212, and the fixing member 22 of the auto-focusing mechanism 201 further includes a first magnet 222 and a base 221. The base 221 is fixed to the housing 1, and the first magnet 222 is fixed to the base 221 and is disposed corresponding to the first coil 23 along a circumferential direction of the first coil 23.

Under the action of the magnetic field of the first magnet 222 when the first coil 23 is energized, the lens holder 212 can move along the direction of the optical axis 211a, and the lens 211 can also move along the direction of the optical axis 211a together with the lens holder 212. Therefore, by controlling the direction and magnitude of the current passing through the first coil 23 can adjust the position of the lens 211, thereby realizing focus adjustment. When there is no current flowing through the first coil 23, the elastic member 213 can restore the lens holder 212 to the original position through its own elasticity.

Figure 10:
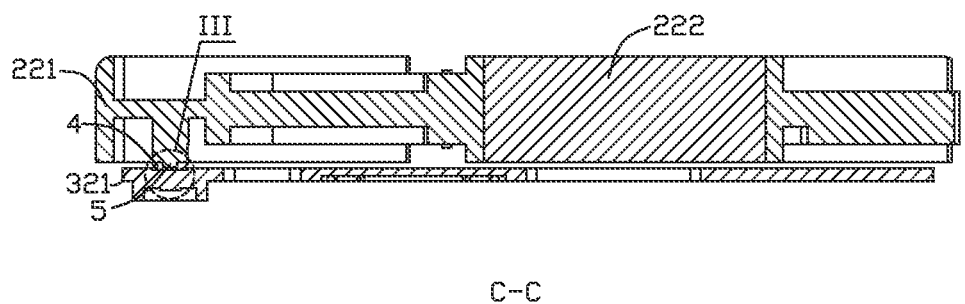
FIG. 10 is a cross-sectional view taken along section line CC of the top view of the fixing member, the shockproof gel, and the movable frame according to a second embodiment of the present disclosure.
Figure 11:
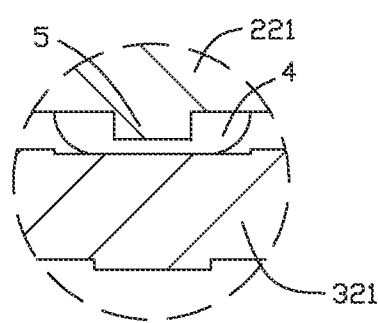
FIG. 11 is a partial enlarged view of part III in FIG. 10.

As shown in FIG. 10 and FIG. 11, in an embodiment, the shock absorbing gel 4 is located on the surface of the base 221 and/or the first magnet 222 facing the image sensor module 32, and abuts surface of the image sensor module 32 facing the focus adjustment mechanism.

When the lens drive is impacted by the external environment, relative movement or collision may occur between the image sensor module 32 and the focus adjustment mechanism. The shock absorbing gel 4 disposed on the base 221 and/or the first magnet 222 and can abut against the module 32 to absorb the interaction force between the image sensor module 32 and the focus adjustment mechanism, and reduce the risk of damage to the internal parts of the lens drive caused by the relative movement or collision between the image sensor module 32 and the focus adjustment mechanism.

As shown in FIGS. 10 and 11, in an embodiment, the base 221 is provided with a protrusion 5 extending toward the image sensor module 32, and the cross-sectional area of the protrusion 5 is smaller than the base 221. The shock absorbing gel 4 can be arranged on the protrusion 5.

When relative movement or collision occurs between the image sensor module 32 and the focus adjustment mechanism, the protrusion 5 is in contact with the image sensor module 32, which can reduce the contact area, thereby reducing damage to the focus adjustment mechanism and the anti-shake mechanism 3. Therefore, disposing the shock absorbing gel 4 on the protrusion 5 can further strengthen the protection of the focus adjustment mechanism and the anti-shake mechanism 3.

As shown in FIG. 1, the auto-focusing mechanism 201 further includes a position detection magnet 25 fixed to the lens holder 212, a first position detection unit 24 corresponding to the position detection magnet 25 and fixed to the base 221, and a first flexible substrate 27 electrically connected to the first position detection unit 24 and the first coil 23. The first position detection unit 24 can determine the position of the lens 211 by detecting the magnetic flux of the position detection magnet 25. The first flexible substrate 27 is electrically connected to the first coil 23 and can energize the first coil 23. The substrate 27 and the first position detection unit 24 can transmit signals to the first position detection unit 24, and adjust the magnitude and direction of the current flowing into the first coil 23 through the position information of the lens 211 detected by the first position detection unit 24, thereby achieving focus adjustment.

As shown in FIGS. 2 and 3, the housing 1 includes a claw member 28 extending toward the auto-focusing mechanism 201, and a holder gel 26 is provided on the surface of the lens holder 212 close to the housing 1, and the holder gel 26 and the claw member 28 are close to and abut against the surface of the lens holder 212. When the first coil 23 is suddenly energized, the lens holder 212 will vibrate to a large extent, the holder gel 26 has shockproof effect, which improves accuracy of the position adjustment of the auto-focusing mechanism to the lens 211.

As shown in FIG. 3, the image sensor module 32 includes a movable frame 321, a filter 322 fixed on the movable frame 321 and close to the lens 21, and a sensor 323 located on the image side of the filter 322.

The filter 322 is used to block infrared rays of undesired wavelengths to protect the sensor 323. Both the filter 322 and the sensor 323 are mounted on the movable frame 321, which can reduce the number of components in the anti-shake mechanism 3 and is beneficial to the miniaturization of the anti-shake mechanism 3. In addition, the verticality of the sensor 323 relative to the direction of the optical axis 211 can be improved, and the possibility of deviation caused by the installation process can be reduced.

As shown in FIG. 3, the anti-shake mechanism 3 further includes a yoke 35 fixed to the side of the movable frame 321 close to the focus adjustment mechanism, a second magnet 34 fixed to the bottom plate 31, and a second coil 33 fixed to the movable frame 321 and located between the yoke 35 and second magnet 34. A current passes into the second coil 33, and under the action of the magnetic field of the second magnet 34, the second coil 33 can drive the movable frame 321 to move in a direction perpendicular to the optical axis 211, thereby driving the filter 322 and the sensor 323 moves along the direction perpendicular to the optical axis 211. The direction and magnitude of the movement of the movable frame 321 can be controlled by controlling the direction and magnitude of the current flowing into the second coil 33, so that the lens drive achieves the anti-shake effect.

As shown in FIGS. 4 to 9, in an embodiment, the shock absorbing gel 4 is located on the surface of the movable frame 321 facing the focus adjustment mechanism, and abuts against the surface of the fixing member 22 of the focus adjustment mechanism facing the anti-shake mechanism 3.

When the second coil 33 is suddenly energized, the movable frame 321 will generate a sudden shock, and the shock absorbing gel 4 in contact with the fixing member 22 can absorb the sudden shock generated by the movable frame 321, and thereby reducing the influence of sudden shock of the movable frame 321 on the focus adjustment mechanism.

As shown in FIG. 6 to FIG. 9, in an embodiment, the side of the movable frame 321 close to the focus adjustment mechanism is provided with a protrusion 5 extending toward the focus adjustment mechanism, and the shock absorbing gel 4 is provided on the protrusion 5.

The cross-sectional area of the protrusion 5 is smaller than the cross-sectional area of the movable frame 321. When the lens drive is impacted by the external environment or the movable frame 321 shakes suddenly, the protrusion 5 contacts the fixing member 22 of the focus adjustment mechanism, which can reduce the contact area, thereby reducing the risk of damage caused by the focus adjustment mechanism and the anti-shake mechanism 3. The shock absorbing gel 4 is arranged on the protrusion 5, which can further strengthen the protection of the focus adjustment mechanism and the anti-shake mechanism 3.

As shown in FIGS. 1 to 3, the yoke 35 of the anti-shake mechanism 3 is mounted on the movable frame 321, and the magnetic force generated between the yoke 35 and the second magnet 34 has a magnetic spring effect, which can provide restoring force for the movable frame 321 when moving in a plane perpendicular to the optical axis 211a.

As shown in FIG. 1 to FIG. 3, in an embodiment, the anti-shake mechanism 3 includes at least two second position detection units 36 fixed to the second coil 33. The detection is performed to determine the position of the image sensor module 32.

The lens drive includes a second flexible substrate 37 electrically connected to the second coil 33, the sensor 323 and the second position detection unit 36. The second flexible substrate 37 can also transmit a signal of the position of the image sensor module 32 detected by the second position detection unit 36, and the control system adjusts the magnitude and direction of the current flowing into the second coil 33 through the second flexible substrate 37, so as to move the image sensor module 32 to a preset position.

In an embodiment, the second flexible substrate 37 connected to the first flexible substrate 27 is disposed along the circumferential direction of the image sensor module 32, and is disposed in the gap between the image sensor module 32 and the housing 1. With the increase of the transmission wires provided in the second flexible substrate 37, the hardness of the second flexible substrate 37 will increase accordingly, which can reduce the obstruction to the movement of the image sensor module 32. The second flexible substrate 37 is connected to the sensor 323, the second coil 33 and the second position detection unit 36 by signal lines, power lines and the like.

As shown in FIG. 3, in an embodiment, the lens drive includes a pedestal 7 fixed on the bottom plate 31, and also includes a bearing surface 38 respectively fixed on the pedestal 7 and the movable frame 321. A bearing member 39 is provided between the opposite bearing surfaces 38 along the direction of the optical axis 211a, and the bearing member 39 can be a ball, which can reduce the resist force between the movable frame 321 and the pedestal 7 during the movement, and reduce the force required for driving the movable frame 321, making the movement of the movable frame 321 more convenient. By adjusting the surface accuracy of the bearing surface 38, the friction between the bearing member 39 and the bearing surface 38 can be reduced, and the bearing member 39 can slide more smoothly. There is mutually attractive magnetic force between the second magnet 34 fixed on the bottom plate 31 and the yoke 35 fixed on the movable frame 321, so that the bottom plate 31 and the movable frame 321 have the effect of being drawn close to each other. Since the pedestal 7 is fixed on the bottom plate 31, the pedestal 7 and the movable frame 321 also have the effect of being drawn close to each other, thus the bearing member 39 between the movable frame 321 and the pedestal 7 is tightened. As shown in FIG. 3, the side of the bottom plate 31 close to the image sensor module 32 is provided with a bottom plate gel 6, and the pedestal 7 is provided with an avoidance hole through which the bottom plate gel 6 can pass, so that the bottom plate gel 6 can abut against one side of the image sensor module 32 close to the bottom plate 31. When the second coil 33 is suddenly energized, the bottom plate gel 6 has shock absorption effect to the shock generated by the image sensor module 32, so that the anti-shake mechanism 3 obtains better anti-shake function.

Figure 12:
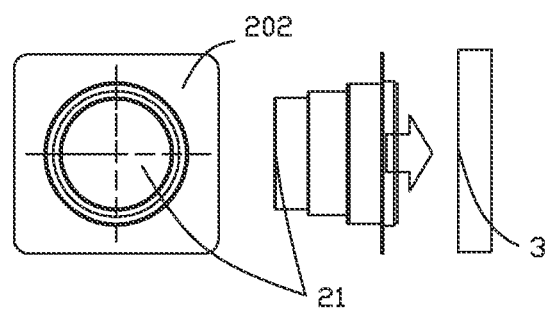
FIG. 12 is a schematic diagram of a zoom mechanism in a lens drive according to an embodiment of the present disclosure.

As shown in FIG. 12, in an embodiment, the focus adjustment mechanism is a zoom mechanism 202, the lens assembly includes at least two lens pieces, and the zoom mechanism 202 can make the adjacent lens pieces retract in multiple stages along the direction of the arrow in FIG. 12, so as to adjust the focal length of the lens assembly 21. The anti-shake mechanism 3 is located at the image side of the zoom mechanism 202. The shockproof gel 4 is located at the position where the distance between the zoom mechanism 202 and the anti-shake mechanism 3 is the smallest, and achieves shock absorption effect between the zoom mechanism 202 and the anti-shake mechanism 3.

Figure 13:
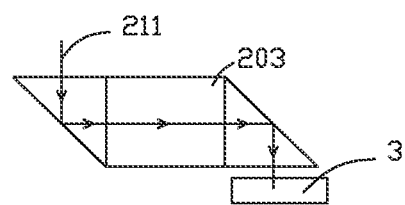
FIG. 13 is a schematic diagram of a periscope lens in a lens drive according to an embodiment of the present disclosure.

As shown in FIG. 13, in an embodiment, the focus adjustment mechanism is a periscope lens 203, that is, the object side and/or the image side of the focus adjustment mechanism is provided with a prism for changing the light path. The direction of the arrow in FIG. 13 shows the direction of the light path. The shockproof gel 4 is located at the position where the distance between the periscope lens 203 and the anti-shake mechanism 3 is the smallest, and achieves shock absorption effect between the periscope lens 203 and the anti-shake mechanism 3.

The structure, features, and effects according to the present disclosure are described in detail above based on the embodiments shown in the drawings. The above are only preferred embodiments of the present disclosure. However, the above embodiment do not limit the scope of the present disclosure. Any changes or equivalent embodiments which still do not exceed the concept covered by the specification and illustrations should fall within the protection scope of the present disclosure.

What is claimed is:

1. A lens drive, comprising:
   a housing;
   a focus adjustment mechanism comprising a lens assembly having an optical axis and a fixing member fixed to the housing, wherein the lens assembly is movably connected to the fixing member, and the lens assembly comprises at least one lens piece movable along an optical axis;
   an anti-shake mechanism comprising a bottom plate fixed on the housing and an image sensor module movable relative to the bottom plate in a direction perpendicular to the optical axis; and
   a shock absorbing gel provided between the fixing member and the image sensor module, the shock absorbing gel can absorb an interaction force between the focus adjustment mechanism and the anti-shake mechanism when the lens drive falls or is impacted by the external environment.

2. The lens drive according to claim 1, wherein the shock absorbing gel is disposed at a shortest distance between the fixing member and the image sensor module, wherein the shortest distance is the distance where the fixing member and the image sensor module most likely to contact each other and collide along a direction of relative motion between the fixing member and the image sensor module when the lens drive is impacted by an external environment.

3. The lens drive according to claim 2, wherein the focus adjustment mechanism is an auto-focusing mechanism, and the lens assembly comprises a lens having the at least one lens piece, a lens holder for installing the lens, and an elastic piece for movably connecting the lens holder to the fixing member; and
   the auto-focusing mechanism comprises a first coil fixed on the lens holder, and the fixing member comprises a base fixed to the housing and a first magnet fixed on the base and opposite to the first coil.

4. The lens drive according to claim 3, wherein the shock absorbing gel is disposed on a surface of the base and/or the first magnet facing the image sensor module.

5. The lens drive according to claim 4, wherein one side of the shock absorbing gel abuts against a surface of the image sensor module facing the focus adjustment mechanism, and the other side of the shock absorbing gel abuts against a surface of the fixing member facing the anti-shake mechanism.

6. The lens drive according to claim 3, wherein a surface of the base facing the image sensor module is provided with a protrusion, and the shock absorbing gel is disposed on the protrusion.

7. The lens drive according to claim 2, wherein the image sensor module comprises a movable frame, a filter fixed to the movable frame and close to the lens, and a sensor located on an image side of the filter, and the shock absorbing gel is provided on a surface of the movable frame facing the focus adjustment mechanism.

8. The lens drive according to claim 7, wherein a surface of the movable frame facing the focus adjustment mechanism is provided with a protrusion, and the shock absorbing gel is provided on the protrusion.

9. The lens drive according to claim 7, wherein one side of the shock absorbing gel abuts against a surface of the image sensor module facing the focus adjustment mechanism, and the other side of the shock absorbing gel abuts against a surface of the fixing member facing the anti-shake mechanism.

10. The lens drive according to claim 7, wherein the anti-shake mechanism further comprises a yoke fixed to the side of the movable frame close to the focus adjustment mechanism and a second magnet fixed to the bottom plate, a magnetic force generated between the yoke and the second magnet has a magnetic spring effect, which can provide restoring force for the movable frame when moving in a plane perpendicular to the optical axis.

11. The lens drive according to claim 2, wherein the gel is disposed at the position having the smallest distance between the fixing member and the image sensor module and further extending outwardly along a direction away from the position having the smallest distance.

12. The lens drive according to claim 1, wherein the focus adjustment mechanism is a zoom mechanism, and the lens assembly comprises at least two lens pieces, and a distance between adjacent lens pieces of the at least two pieces is adjustable.

13. The lens drive according to claim 1, wherein a prism for changing an optical path is provided on an object side and/or an image side of the focus adjustment mechanism.

14. The lens drive according to claim 1, wherein the lens drive comprises a pedestal fixed on the bottom plate, a bearing surface respectively fixed on the pedestal and the movable frame, and bearing member provided between the opposite bearing surfaces along the direction of the optical axis.

15. The lens drive according to claim 14, wherein and the bearing member is a ball.

\* \* \* \* \*